(12) United States Patent
Khinkis et al.

(10) Patent No.: US 6,321,743 B1
(45) Date of Patent: Nov. 27, 2001

(54) SINGLE-ENDED SELF-RECUPERATED RADIANT TUBE ANNULUS SYSTEM

(75) Inventors: Mark J. Khinkis, Morton Grove, IL (US); Harry S. Kurek, Dyer, IN (US); Hamid A. Abbasi, Naperville; Peter T. Wurm, Chicago, both of IL (US)

(73) Assignee: Institute of Gas Technology, Des Plaines, IL (US)

( * ) Notice: Subject to any disclaimer, the term of this patent is extended or adjusted under 35 U.S.C. 154(b) by 0 days.

(21) Appl. No.: 09/606,500

(22) Filed: Jun. 29, 2000

(51) Int. Cl.⁷ ..................................................... F27B 5/14
(52) U.S. Cl. ..................... 126/91 A; 432/209; 431/215; 431/353
(58) Field of Search ........................ 126/91 A; 432/209; 431/115, 116, 215, 243, 353

(56) References Cited

U.S. PATENT DOCUMENTS

| | | | |
|---|---|---|---|
| 331,261 | * 11/1885 | Stuertz | ................................. 431/215 |
| 3,225,757 | 12/1965 | Keller . | |
| 3,685,977 | * 8/1972 | Goodman | ............................ 431/116 |
| 3,946,719 | 3/1976 | Bark et al. . | |
| 4,062,343 | 12/1977 | Spielman . | |
| 4,140,482 | 2/1979 | Simon . | |
| 4,401,099 | 8/1983 | Collier . | |
| 4,479,535 | 10/1984 | Echigo et al. . | |
| 4,531,904 | 7/1985 | Sato et al. . | |
| 4,705,022 | * 11/1987 | Collier | ............................... 126/91 A |
| 4,915,038 | * 4/1990 | Sujata et al. | ......................... 431/215 |
| 5,016,610 | * 5/1991 | Meguro et al. | .................... 126/91 A |
| 5,203,690 | * 4/1993 | Maruko | ................................ 431/353 |
| 5,224,542 | 7/1993 | Hemsath . | |
| 5,241,949 | 9/1993 | Collier . | |

FOREIGN PATENT DOCUMENTS

01285703 * 11/1989 (JP) .................................... 126/91 A

* cited by examiner

Primary Examiner—Ira S. Lazarus
Assistant Examiner—Sara Clarke
(74) Attorney, Agent, or Firm—Pauley Peterson Kinne & Fejer

(57) ABSTRACT

A method and apparatus for combustion of a fuel and oxidant in which at least a portion of a fuel and at least a portion of an oxidant are introduced into an annular region formed by an outer tubular member closed off at one end and an inner tubular member open at both ends concentrically disposed within the outer tubular member, forming a fuel/oxidant mixture. The fuel/oxidant mixture is ignited in the annular region, forming products of combustion therein. The products of combustion are then exhausted through the inner tubular member providing oxidant preheating prior to forming the fuel/oxidant mixture.

23 Claims, 3 Drawing Sheets

SINGLE-ENDED SELF-RECUPERATED RADIANT TUBE ANNULUS SYSTEM

BACKGROUND OF THE INVENTION

1. Field of the Invention

This invention relates to a fossil fuel fired, single-ended, self-recuperated radiant tube annulus system suitable for use in radiant tube heating applications, such as ferrous and nonferrous metal treatments, whereby, in addition to providing heat for transfer to the intended load, the products of combustion from the combustion of the fossil fuel may be used to preheat the oxidant used for the combustion of the fossil fuel.

2. Description of Prior Art

Radiant tubes have long been used in industrial heating applications for heating a variety of materials, such as steel or other solid materials in a furnace. Conventionally, radiant tube heaters have been powered by electrical heating elements or by fuel-fired burners. Electrically heated radiant tubes basically comprise heating elements within a tube which extend into a furnace or work zone. The elements radiate heat to the tube and the tube radiates heat to the work. In high temperature heating applications, electrically heated radiant tubes are preferred because the heating elements radiate uniform heat flux to the tube. However, the cost of electricity often dictates that fuel-fired burners be used in place of the electrical heating elements to provide products of combustion into a tube which, in turn, will radiate heat to the work.

In conventional radiant tube designs, the high-temperature combustion products are supplied into the radiant tube from one end thereof and, after having been used for heating, are then discharged from the other end thereof. It will be apparent that the discharged products of combustion still have a relatively high temperature. One system which has been developed to address this issue is a recuperative radiant tube burner system comprising an outer heat resistant radiant tube having a closed forward end in which is located an elongated recuperator tube which coats with the radiant tube to define an annular exhaust passage for the flow of hot gases produced by a burner assembly disposed within the recuperator tube as taught by U.S. Pat. No. 5,241,949 to Collier and U.S. Pat. No. 4,705,022, also to Collier. U.S. Pat. No. 5,016,610 to Meguro et al. teaches a radiant-type heater having inner and outer concentric tubes and a fuel supply tube disposed within the inner concentric tube. The end of the outer concentric tube opposite the fuel supply end of the heater is closed off as a result of which combustion products resulting from combustion of the fuel from the fuel supply tube in the inner concentric tube are exhausted through the annulus formed between the inner and outer concentric tubes. And, U.S. Pat. No. 4,401,099 to Collier teaches a single-ended recuperative radiant tube assembly having inner and outer recuperative tube assemblies positioned in a counterflow arrangement within a radiant tube assembly whereby hot exhaust gases emitted from the burner within the single-ended radiant tube assembly are directed through a flame tube to an annular exhaust chamber located between the outer recuperative tube and radiant tube assemblies. Ambient air flowing toward the burner in an air chamber between the inner and outer recuperator tube assemblies is heated by the exhaust gases in the annular exhaust chamber. See also U.S. Pat. No. 3,225,757 to Keller which teaches a radiant tube heater closed at one end having a central fuel conduit, an air conduit surrounding the fuel input conduit with orifices which enable air to pass through the walls of the air conduit, and a housing around the air conduit, whereby combustion occurs in the space between the housing and the air conduit; U.S. Pat. No. 4,062,343 to Spielman which teaches a tube firing burner having a tube, one end of which is supported within an opening in a heat-insulating wall and which is fired by a dual-fuel burner where, disposed within the end portion of the tube is a combustion sleeve which extends the flame of the burner inwardly beyond the wall, thereby preventing the insulated end portion of the tube from being burned out, and an abrupt restriction is formed at the discharge end of the combustion sleeve, creating turbulence in the air/fuel mixture so as to promote cleaner and more efficient burning; U.S. Pat. No. 3,946,719 to Bark et al. which teaches a radiant gas heater having an externally heat radiating shell, a central gas fuel tube, and an intermediate perforated air conducting tube from the inside of which air flows into a combustion chamber, all arranged coaxially; U.S. Pat. No. 4,531,904 to Sato et al. which teaches a radiant tube burner having a concentrically arranged outer air flow nozzle, fuel gas nozzles arranged in a circle within the outer air flow nozzle and an inner air flow nozzle; U.S. Pat. No. 4,140,482 to Simon which teaches a fuel-fired radiant-heating tube having an acoustic damper or muffler comprising a double-wall housing defining two elongated annular flow passages in indirect heat-exchange relationship through a thermally conductive inner wall whereby the combustion exhaust gases are conducted through one of these passages while combustion-sustaining gas, for example, air, is supplied through the other in counterflow to the exhaust gas, thereby preheating the air; U.S. Pat. No. 4,479,535 to Echigo et al. which teaches a radiant tube heated by high-temperature gases supplied from one end having a heat exchanger disposed in proximity to the gas outlet of the tube so as to recover thermal energy from the combustion gases before they are exhausted; and U.S. Pat. No. 5,224,542 to Hemsath which teaches a radiant tube heater having a gas-fired burner which fires heated products of combustion into an inner longitudinally-extending tube which is concentrically pinned to an outer longitudinally-extending tube which, in turn, is concentrically mounted within a heat transfer tube which radiates heat to the work.

Also, within the industrial burner art, there are numerous fuel fired burner arrangements which, at first glance, might bear some structural resemblance to the fuel fired radiant tube heater of the present invention, but which have entirely different functions and purposes associated with the structure.

Although more efficient than conventional "straight-through" radiant tube heaters, conventional recuperative-type radiant tube heaters possess certain limitations resulting from their design. For example, the service life of the inner tubes is limited due to the higher temperatures to which the inner tube is exposed relative to the outer tube. In addition, heat transfer from the combustion products to the outer radiant tube is restricted by the higher temperatures present within the inner tube relative to the outer tube.

SUMMARY OF THE INVENTION

Thus, it is one object of this invention to provide a single-ended, self-recuperated radiant tube combustion system and method which, compared to conventional designs, enables longer service life for the inner tube.

It is another object of this invention to provide a single-ended, self-recuperated radiant tube combustion system and method which enables higher heat transfer from the combustion products to the outer radiant tube wall compared to conventional recuperative radiant tube designs.

It is another object of this invention to provide a single-ended, self-recuperated radiant tube design which, compared to known designs, is capable of operating at higher temperatures utilizing the same materials.

It is yet another object of this invention to provide a single-ended, self-recuperated radiant tube design which results in lower $NO_X$ emissions compared to known designs.

These and other objects of this invention are addressed by a method for combustion of a fuel and oxidant in which at least a portion of a fuel and at least a portion of an oxidant for combustion are introduced into the annular region formed by an outer tubular member closed off at one end and an inner tubular member open proximate both ends concentrically disposed within the outer tubular member, forming a fuel/oxidant mixture. In accordance with one embodiment of this invention, the inner tubular member is disposed at a distance from the closed off end and the combustion products inlet is disposed at the end of the inner tubular member proximate the closed off end of the outer tubular member. In accordance with an alternative embodiment, the inner tubular member abuts the closed off end of the outer tubular member in which case the combustion products inlet is in the form of one or more openings formed by the wall of the inner tubular member proximate the closed off end of the outer tubular member. The fuel/oxidant mixture is ignited in the annular region, forming products of combustion in the annular region, and the products of combustion are then exhausted through the inner tubular member.

The radiant tube system of this invention comprises an outer tubular member closed off at one end and an inner tubular member having a combustion products inlet end oriented toward the closed off end and a combustion products outlet end at an opposite end of said inner tubular member and extending through an open end of the outer tubular member, forming an annular region between the inner tubular member and the outer tubular member. The inner tubular member forms at least one combustion products inlet opening proximate the combustion products inlet end. By the term "proximate", we mean at the end of the tubular member or close to the end of the tubular member. Seal means for sealing between the outer tubular member and the inner tubular member are provided proximate the open end of the outer tubular member. An oxidant conduit is connected to the outer tubular member proximate the combustion products outlet end of the inner tubular member and in fluid communication with the annular region and a fuel conduit is connected to the outer tubular member in fluid communication with the annular region.

BRIEF DESCRIPTION OF THE DRAWINGS

These and other objects and features of this invention will be better understood from the following detailed description taken in conjunction with the drawings wherein.

DESCRIPTION OF PREFERRED EMBODIMENTS

Figure 1:
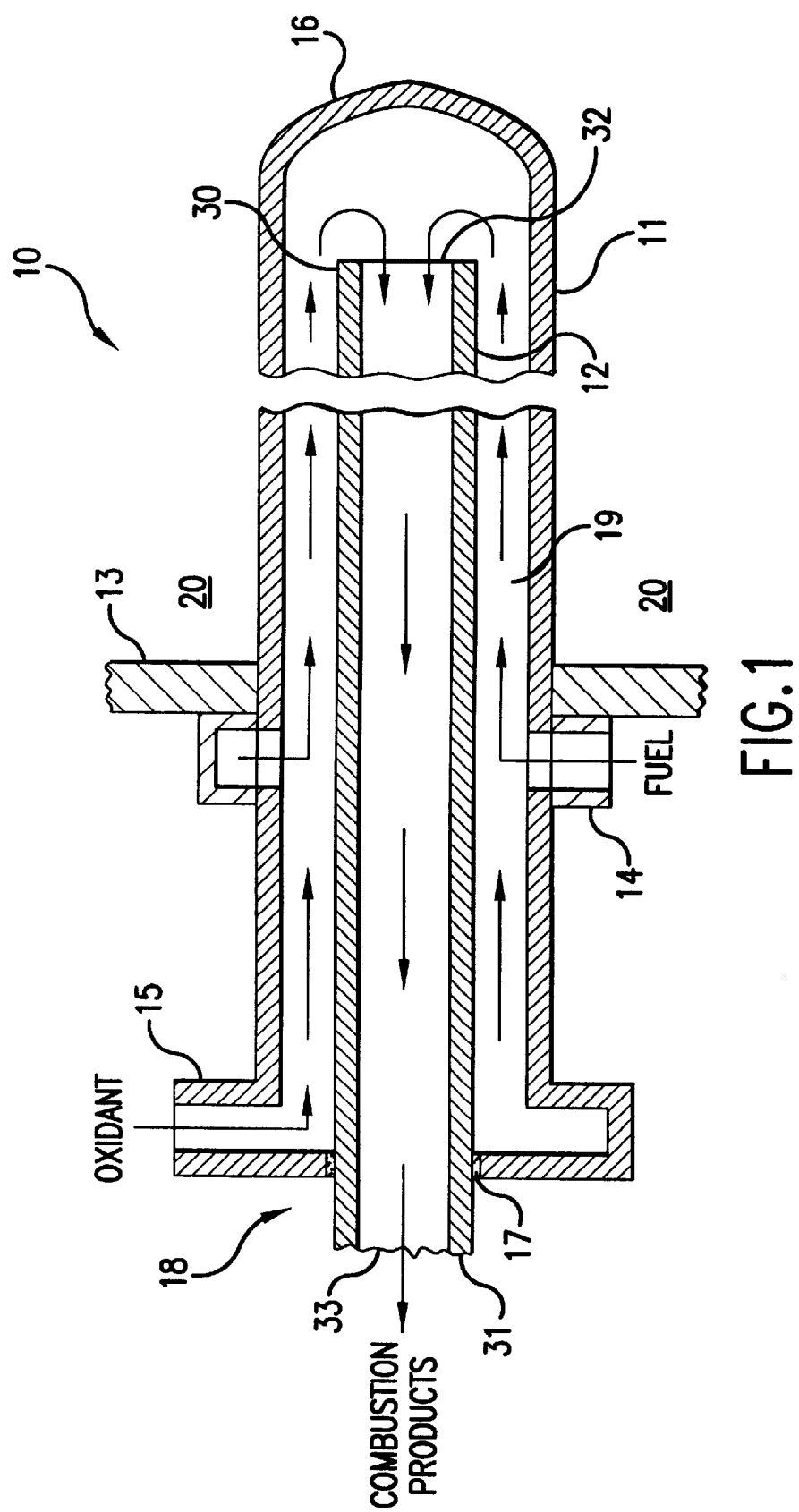
FIG. 1 is a lateral cross-sectional view of a single-ended, self-recuperated radiant tube system in accordance with one embodiment of this invention wherein the inner tubular member is disposed at a distance from the closed off end of the outer tubular member.

FIG. 1 shows a lateral cross-sectional view of a single-ended, self-recuperated radiant tube system 10 in accordance with one embodiment of this invention. Radiant tube system 10 comprises an outer tubular member 11 having closed off end 16 and an open end 18 at the opposite end of outer tubular member 11. Inner tubular member 12 in accordance with one embodiment of this invention, which functions as a recuperator, comprises a combustion products inlet end 30 and a combustion products outlet end 31 and is concentrically disposed within outer tubular member 11 disposed at a distance from closed offend 16 and extending through open end 18 of outer tubular member 11. Annular region 19 is disposed between inner tubular member or recuperator 12 and outer tubular member 11. Proximate open end 18 of outer tubular member 11, sealing means 17 are provided for sealing between outer tubular member 11 and inner tubular member 12 so as to insure against leakage from annular region 19 through open end 18 of outer tubular member 11. Sealing between outer tubular member 11 and inner tubular member 12 may be accomplished by any means known to those skilled in the art such as, for example, welding. Fuel conduit 14 is connected to outer tubular member 11 and is in fluid communication with annular region 19. Oxidant conduit 15 is connected to outer tubular member 11 proximate open end 18 and is in fluid communication with annular region 19. Oxygen conduit 15 is connected to outer tubular member 11 proximate open end 18 and is in fluid communication with annular region 19. In accordance with one embodiment of this invention, radiant tube system 10 is connected to and extends through an opening formed by wall 13 of material heating chamber 20.

In operation, oxidant is introduced into annular region 19 through oxidant conduit 15 and fuel is introduced into annular region 19 through fuel conduit 14. The fuel and oxidant undergo mixing within annular region 19 and are ignited, thereby forming combustion products in annular region 19 which are subsequently conveyed out of radiant tube system 10 by means of inner tubular member 12, thereby preheating the oxidant. As can be seen from FIG. 1, the hottest combustion products temperatures are generated in annular region 19, thereby maximizing the temperature differential between the combustion products and the material to be heated in material heating chamber 20, thereby providing improved heat transfer from the combustion products through the wall of outer tubular member 11 into the material to be heated in material heating chamber 20.

The combustion products, having been reduced in temperature by transfer of heat through outer tubular member 11 into the material to be heated in material heating chamber 20, flow toward closed end 16 of outer tubular member 11, causing the combustion products to reverse their direction of flow and enter inner tubular member 12 through combustion products inlet opening 32 for discharge from radiant tube system 10 through combustion products outlet opening 33 of inner tubular member 12. As the combustion products flow through inner tubular member 12, at least a portion of the heat remaining in the combustion products is transferred through the wall of inner tubular member 12 into annular region 19, resulting in preheating of the oxidant. Preheating the oxidant in this manner further reduces the temperature of the combustion products exhausted from radiant tube system 10, thereby increasing the overall efficiency of radiant tube system 10.

Temperatures of outer tubular member 11 and inner tubular member 12 during operation of radiant tube system 10 are typically in a range of about 1600–2500° F., thereby requiring tube materials able to withstand such temperatures. In accordance with one embodiment of this invention, inner tubular member 12 and/or outer tubular member 11 are constructed of a material selected from the group consisting of metal alloys and ceramics. Suitable metal alloys include, but are not limited to, high temperature stainless steel alloys capable of withstanding temperatures in excess of 2000° F. Suitable ceramic materials include, but are not limited to, silicon carbide, SiC. As previously stated, any metal alloy or ceramic material capable of withstanding the operating temperatures of the radiant tube system are suitable materials for construction of inner tubular member 12 and outer tubular member 11.

As previously stated, the highest combustion products temperatures resulting from operation of radiant tube system 10 in accordance with the method of this invention occur in annular region 19 between inner tubular member 12 and outer tubular member 11. Thus, the combustion products exhausted through inner tubular member 12 are generally lower in temperature as a result of which inner tubular member 12 is typically lower in temperature than outer tubular member 11 which, in turn, enables higher heat transfer than some known recuperative radiant tube systems in which combustion occurs within the inner tube and is exhausted through the annular region formed between the inner tube and the outer radiant tube walls. As a result, at comparable operating temperatures, the temperature of inner tubular member 12 of radiant tube system 10 is cooler than in conventional systems which, in turn, translates into a longer service life for inner tubular member 12 compared to conventional systems.

Figure 2:
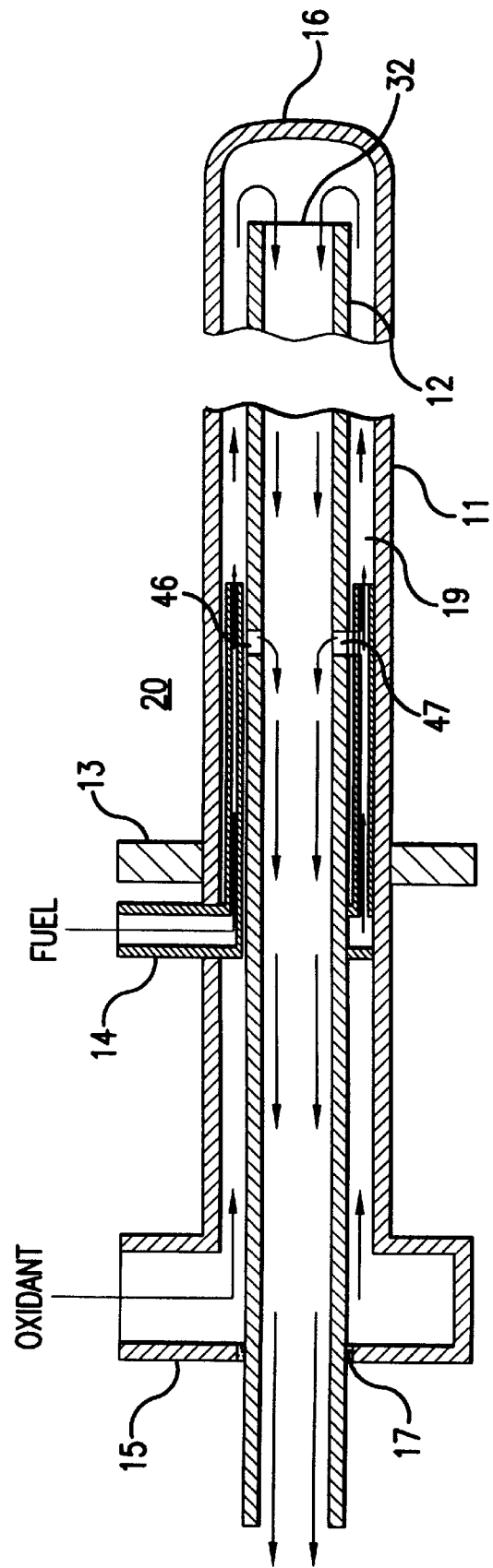
FIG. 2 is a lateral cross-sectional view of a single-ended, self-recuperated radiant tube system employing air staging in accordance with one embodiment of this invention.

FIG. 2 shows an alternative embodiment of this invention in which second stage oxidant is injected into inner tubular member 12 so as to mix with the products of combustion flowing through inner tubular member 12 thereby ensuring substantially complete combustion prior to exhausting of the combustion products through combustion products outlet 33. In accordance with this embodiment, second stage oxidant is introduced through secondary oxidant openings 46, 47 formed by the wall of inner tubular member 12 at a location between combustion products outlet 33 and a point of introduction of fuel from fuel conduit 14 into annular region 19. It will be apparent to those skilled in the art that other fluids may be introduced in a similar fashion directly into inner tubular member 12 for the purpose of affecting the quality of combustion products exhausted from radiant tube system 10.

Figure 3:
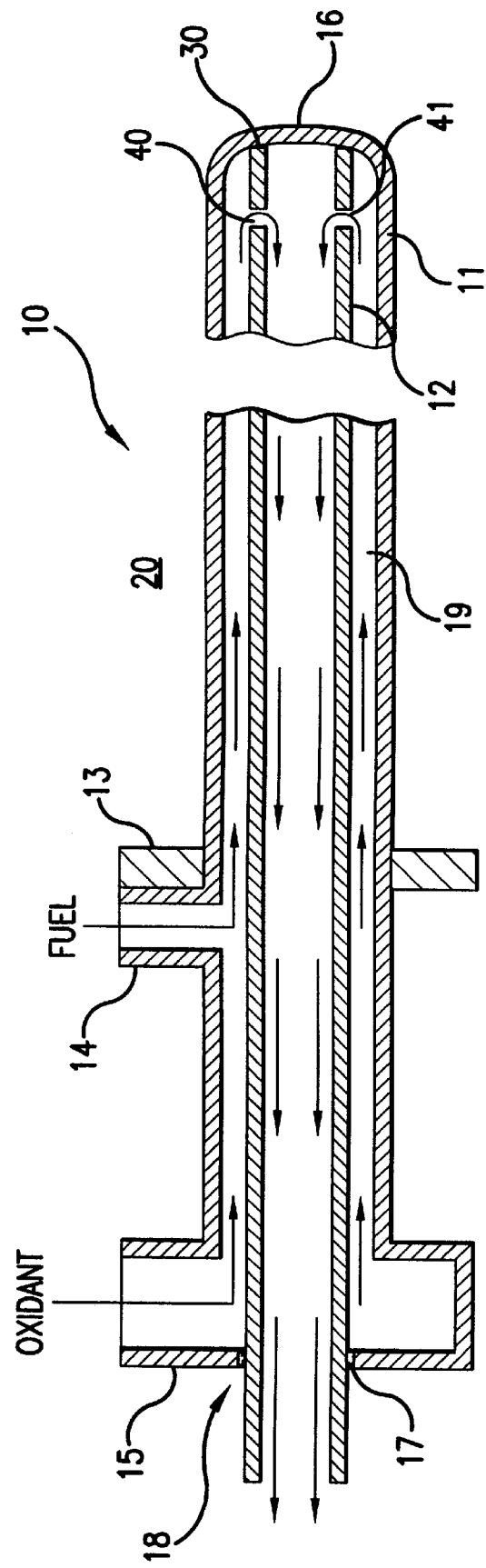
FIG. 3 is a lateral cross-sectional view of a single-ended, self-recuperated radiant tube system in accordance with one embodiment of this invention wherein one end of the inner tubular member abuts the closed off end of the outer tubular member.

FIG. 3 shows yet a third embodiment of the radiant tube system of this invention. In accordance with this embodiment, combustion products inlet end 30 of inner tubular member 12 abuts closed end 16 of outer tubular member 11. In this case, combustion products generated in annular region 19 enter into inner tubular member 12 through combustion products inlets 40, 41 formed by the walls of inner tubular member 12 proximate combustion products inlet end 30 of inner tubular member 12.

Suitable fuels for use in the single-ended, self-recuperated radiant tube system of this invention include liquid and gaseous hydrocarbon fuels. The preferred fuel is natural gas. Suitable oxidants are air and oxidants comprising oxygen in an amount greater than the amount of oxygen in air.

While in the foregoing specification this invention has been described in relation to certain preferred embodiments thereof, and many details have been set forth for purpose of illustration, it will be apparent to those skilled in the art that the invention is susceptible to additional embodiments and that certain of the details described herein can be varied considerably without departing from the basic principles of the invention.

We claim:

1. A method for combustion of a fuel and oxidant comprising the steps of:

introducing at least a portion of a fuel and at least a portion of an oxidant into an annular region formed by an outer tubular member having an open end and a closed offend and an inner tubular member having a combustion products inlet end oriented toward said closed offend and a combustion products outlet end oriented toward said open end concentrically disposed within said outer tubular member and forming at least one combustion products inlet opening proximate said combustion products inlet end, forming a fuel/oxidant mixture;

igniting said fuel/oxidant mixture in said annular region, forming products of combustion in said annular region; and exhausting said products of combustion through said inner tubular member.

2. A method in accordance with claim 1, wherein said combustion products inlet end is disposed at a distance from said closed off end of said outer tubular member.

3. A method in accordance with claim 1, wherein said combustion products inlet end abuts said closed off end.

4. A method in accordance with claim 1, wherein said fuel and oxidant are premixed prior to introduction into said annular region.

5. A method in accordance with claim 1, wherein said oxidant is preheated in said annular region prior to mixing with said fuel.

6. A method in accordance with claim 1, wherein heat generated by said combustion is transferred through said outer tubular member to a fluid surrounding at least a portion of said outer member disposed toward said closed off end.

7. A method in accordance with claim 1, wherein said oxidant is simultaneously introduced into said annular region and an interior of said inner tubular member.

8. A method in accordance with claim 1, wherein an inner tubular member temperature is lower than an outer tubular member temperature.

9. A method in accordance with claim 1, wherein said fuel is natural gas.

10. A method in accordance with claim 8, wherein said inner tubular member temperature and said outer tubular member temperature are in a range of about 1600° F. to about 2500° F.

11. A radiant tube system comprising:

an outer tubular member having an open end and a closed off end;

an inner tubular member concentrically disposed within said outer tubular member and extending through said open end of said outer tubular member, forming an annular region between said inner tubular member and said outer tubular member, said inner tubular member having a combustion products inlet end oriented toward said closed off end and a combustion products outlet end oriented toward said open end, and forming at least one combustion products inlet opening proximate said combustion products inlet end;

seal means for sealing between said outer tubular member and said inner tubular member proximate said open end of said outer tubular member;

a fuel conduit connected to an outer surface of said outer tubular member proximate said open end and in fluid communication with said annular region;

an oxidant conduit connected to the outer surface of said outer tubular member and in fluid communication with said annular region; and said inner tubular member forming at least one second stage oxidant inlet at a location between said oxidant conduit and said fuel conduit.

12. A system in accordance with claim 11, wherein said inner tubular member and said outer tubular member are constructed of a material selected from the group consisting of metal alloys and ceramics.

13. A system in accordance with claim 12, wherein said inner tubular member and said outer tubular member are constructed of stainless steel.

14. A system in accordance with claim 12, wherein said inner tubular member and said outer tubular member are constructed of SiC.

15. A system in accordance with claim 11, wherein said combustion products inlet end is disposed at a distance from said closed off end.

16. A system in accordance with claim 11, wherein said combustion products inlet end abuts said closed off end.

17. A furnace comprising:

at least one wall forming a combustion chamber;

at least one radiant tube heater comprising an outer tubular member having a closed off heating end and an input end connected to said at least one wall, said closed off heating end disposed within said combustion chamber and said input end disposed outside of said combustion chamber;

an inner tubular member concentrically disposed within said outer tubular member and extending through said input end of said outer tubular member, forming an annular region between said inner tubular member and said outer tubular member, said inner tubular member having a combustion products inlet end oriented toward said closed offend and an oppositely disposed combustion products outlet end and forming at least one combustion products inlet opening proximate said combustion products inlet end;

seal means for sealing between said outer tubular member and said inner tubular member proximate said input end of said outer tubular member;

a fuel conduit connected to said outer tubular member proximate said input end and in fluid communication with said annular region; and an oxidant conduit connected to said outer tubular member and in fluid communication with said annular region.

18. A furnace in accordance with claim 17, wherein said inner tubular member and said outer tubular member are constructed of a material selected from the group consisting of metal alloys and ceramics.

19. A furnace in accordance with claim 18, wherein said inner tubular member and said outer tubular member are constructed of stainless steel.

20. A furnace in accordance with claim 18, wherein said inner tubular member and said outer tubular member are constructed of SiC.

21. A furnace in accordance with claim 17, wherein said combustion products inlet end is disposed at a distance from said closed off end.

22. A furnace in accordance with claim 17, wherein said combustion products inlet end abuts said closed off end.

23. A furnace in accordance with claim 17, wherein said inner tubular member forms at least one second stage oxidant inlet at a location between said oxidant conduit and said fuel conduit.

* * * * *